United States Patent
Grauer

[11] 3,750,468
[45] Aug. 7, 1973

[54] LINED FLOW TUBE FOR ELECTROMAGNETIC FLOWMETER

[75] Inventor: Oscar Grauer, Philadelphia, Pa.

[73] Assignee: Fischer & Porter Company, Warminster, Pa.

[22] Filed: Apr. 8, 1971

[21] Appl. No.: 132,385

[52] U.S. Cl............................ 73/194 EM, 138/140
[51] Int. Cl............................ G01f 1/00, G01p 5/08
[58] Field of Search................. 73/194 EM; 310/11; 138/140, 146, 147, 153, DIG. 6

[56] References Cited
UNITED STATES PATENTS
2,070,291   2/1937   McHugh .................... 138/140 X
2,198,149   4/1940   Bangert ..................... 138/140 X Primary Examiner—Charles A. Ruehl
Attorney—Michael Ebert

[57] ABSTRACT

An electromagnetic flowmeter having a pipe section through which fluid to be measured is conducted, the pipe section being constituted by a titanium tube having an insulating liner formed of alumina. A pair of electrodes are mounted at diametrically opposed positions on the pipe section and are insulated from the tube. Surrounding the pipe section are electromagnetic coils adapted to establish a field within the pipe section.

4 Claims, 4 Drawing Figures

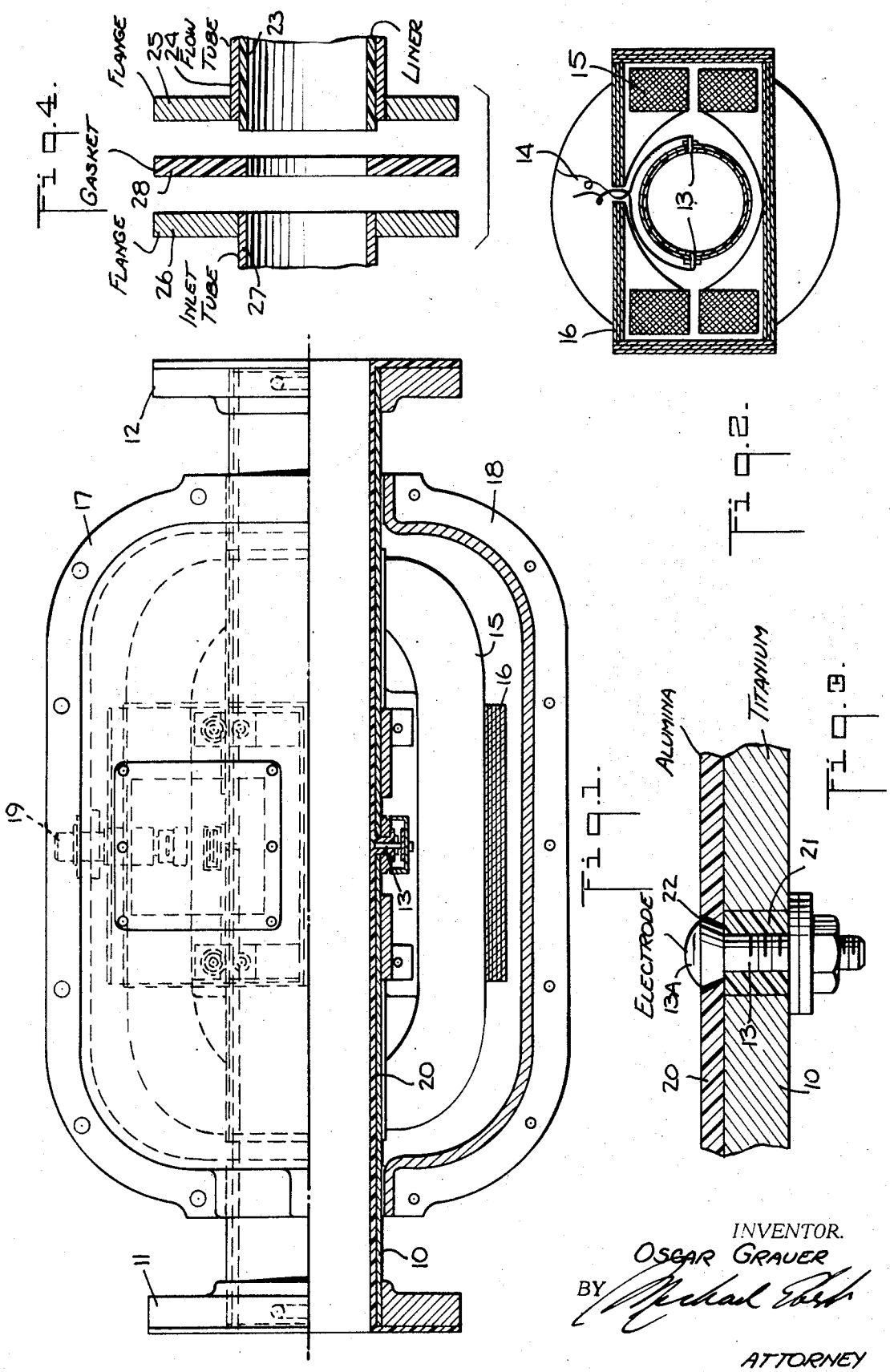

LINED FLOW TUBE FOR ELECTROMAGNETIC FLOWMETER

BACKGROUND OF THE INVENTION

This invention relates generally to electromagnetic flowmeters, and in particular to an improved flowmeter structure having a pipe section lined with an alumina tube, the flowmeter being adapted to measure high-temperature fluids as well as those which are highly corrosive.

The magnetic flowmeter is adapted to measure volume rates of those fluids which present difficult handling problems, such as corrosive acids, sewage, slurries, detergents, and the like. In a magnetic flowmeter, a uniformly-distributed magnetic field is generated which is mutually perpendicular to the longitudinal axis of the meter pipe through which the fluid flows and to the axis of the meter electrodes. Since the velocity of the fluid is directed along the longitudinal axis of the pipe, the voltage induced within the fluid will be perpendicular to both the velocity of this fluid and the flux linkages of the magnetic field. Thus the metered fluid constitutes a series of fluid conductors moving through the magnetic field. The more rapid is the rate of flow, the greater the instantaneous value of the voltage established at the electrodes.

Conventional flowmeters make use of a flanged stainless-steel pipe section, the inner pipe and flange surfaces being lined with an insulating material. Two cylindrical electrodes are mounted at diametrically opposed positions on the central portion of the pipe section, and are completely insulated from the pipe by bushings. The end surfaces of the electrodes are flush with the inner surface of the insulating liner and come in contact with the fluid to be metered. A field coil assembly is provided consisting of two saddle-shaped magnet coils surrounded by a box-shaped laminated iron core, which in turn completely encompasses the central portion of the flowmeter. The field coil assembly is designed to produce a linear and uniform magnetic field through the metering section.

The instantaneous voltage developed across the meter electrodes represents the average fluid velocity of the flow profile passing the electrodes at a given moment, and the flowmeter will produce an output signal equal to a continuous average flow rate regardless of whether the flow profile is laminar or turbulent. A flowmeter output signal is linearly proportional to the volumetric rate of flow through it.

It has heretofore been the practice to provide insulating liners fabricated of Teflon, neoprene, rubber or vitreous enamel, depending on the anticipated nature of the fluid to be measured. While such liner materials are satisfactory for many fluids, in those instances in which the flowmeter is intended to measure the flow rate of fluids which are highly corrosive or which are heated to exceptionally high temperature levels, approaching 100° C or higher, existing liners may fail after a relatively short period of operation. Moreover, the fluids may contain abrasive particles tending to score or mutilate conventional liners.

SUMMARY OF THE INVENTION

In view of the foregoing, it is the main object of this invention to provide an electromagnetic flowmeter having a pipe section of high structural strength and capable of measuring highly corrosive fluids as well as fluids at high temperatures.

More specifically, it is an object of this invention to provide a pipe section formed of a titanium tube having a liner of alumina, which refractory liner material is not only impervious to high-temperature fluids but is also resistant to corrosive fluids and to mechanical abrasion, whereby the pipe section is capable of prolonged, trouble-free operation.

Also an object of the invention is to provide a flowmeter having a pipe section for a magnetic flowmeter which may be manufactured at relatively low cost.

Briefly stated, these objects are accomplished in a magnetic flowmeter having a pipe section constituted by a titanium tube provided with coupling flanges mounted at the ends thereof, the tube having an alumina liner snugly fitted therein to avoid interfacial seepage, a pair of electrodes being mounted at diametrically opposed positions on the pipe section, the section being surrounded by electromagnetic coils to establish a field therein.

OUTLINE OF THE DRAWING

For a better understanding of the invention as well as other objects and further features thereof, reference is made to the following detailed description to be read in conjunction with the accompanying drawing, in which:

FIG. 1 is an elevational view, partly in section, of a magnetic flowmeter incorporating a pipe section in accordance with the invention;

FIG. 2 is a transverse section taken in the plane indicated by line 2—2 in FIG. 1;

FIG. 3 is a section through the wall of the pipe section showing how an electrode is mounted thereon; and FIG. 4 is a longitudinal section taken through another embodiment of a magnetic flowmeter having a liner therein in accordance with the invention.

DESCRIPTION OF THE INVENTION

Referring now to the drawing, a flowmeter in accordance with the invention comprises a non-magnetic metal flow tube 10, preferably of titanium, provided with annular end flanges 11 and 12, by means of which external couplings may be made to direct the liquid undergoing measurement through the tube. In lieu of titanium one may use stainless steel, inconel (nickel-chromium alloy) or other non-magnetic material of high strength.

At diametrically-opposed positions thereon, tube 10 is provided with bores in which are inserted the shanks of electrodes 13, the heads 13A of the electrodes being exposed to the fluid passing through the flow tube. Leads 14 attached to the electrodes are extended therefrom for connection to an external circuit or secondary unit to supply signals thereto.

To establish a magnetic field extending at right angles to the diametrical axis passing through electrodes 13, there is provided a pair of coils 15 of identical shape. A core 16 surrounds the coils and is constituted by laminations of magnet iron. The coils and core are enclosed within a shielded housing formed by steel casting half-sections 17 and 18. Leads 14 from the electrodes are brought out of the housing through terminals indicated at 19. The manner in which the coils are energized forms no part of the present invention, whose concern is only with the construction of the flow tube and the liner associated therewith.

The reason flow tube 10 is made of titanium rather than stainless steel is that while the weight of titanium is only 56 percent that of stainless steel, it is nevertheless stronger than steel. Titanium is an inherently active metal, and while it has some degree of corrosion resistance by reason of the tough protective oxide film which is formed on its surface in natural environments, it reacts with strong reducing acids, dry chlorine and other chemicals. Titanium is subject to attack in environments containing hydrofluoric acid, phosphoric acid, formic acid and sulfuric acid.

Telescoped within titanium flow tube 10 is an insulating liner 20 of ceramic material, preferably formed of alumina which not only affords electrical insulation but at the same time acts as a protective liner that is unaffected by fluids at high temperatures, fluids which are chemically corrosive, and fluids containing abrasive agents. Alumina or aluminum oxide occurs in several crystalline forms including corundum which is next to diamond in hardness. Because of its high fusion point (2,050° C), alumina is inherently an excellent refractory material.

By combining the titanium flow tube with an alumina liner, one then has an assembly not only of exceptional structural strength, but also resistant to high-temperature and corrosive fluids passing therethrough. The alumina liner is strong under compression but in inherently weak under tension. However, because the liner is reinforced by the titanium tube, the resultant pipe section is capable of operation under rigorous conditions.

In fabrication, the titanium tube is made with an internal diameter slightly smaller than the outside diameter of the alumina tube, the titanium tube then being fitted over the alumina tube by shrink-fitting, so that no space exists therebetween. But if other techniques are used to fabricate the liner and tube assembly, gaskets may be used at the ends of the assembly to avoid seepage of fluid into any space that may exist between the liner and tube.

While the heat-resistant properties of alumina are of value when used in a liner in a flow tube subject to fluids at elevated temperatures, because of its exceptional mechanical properties, it is also highly resistant to mechanical abrasion. Moreover, alumina has high dielectric strength, a factor of great importance in a magnetic flowmeter. An alumina liner may be fabricated and fired by techniques of the type currently used in conjunction with clay, by slip-casting or by any other known method.

It is important that the electrodes be insulated from titanium tube 10 and that there be no fluid leakage through the electrodes. As shown in FIG. 3, this may be accomplished by passing electrode 13 through an insulating bushing 21 fitted in the hole bored in tube 10, the bushing being preferably made of Teflon or other suitable plastic material. To effect a fluid-tight seal between head 13A of electrode 13 and the wall of the bore in liner 20 which accommodates the head, the alumina wall is metalized and the conical edge of the head is welded thereto at 22.

The electrodes may be hermetically sealed into the alumina body, effecting a bacteria-proof seal to permit sanitary or biological fluid flow measurement with the magnetic flowmeter. This hermetic sealing may be effected by providing two diametrically-opposed holes in the meter at the proper locations and metalizing the internal diameter of these holes with moly-manganese or platinum glass frit, and electroplating the electrodes which can then be brazed into place with a suitable brazing metal, such as gold or silver-copper.

An arrangement adapted to avoid fluid seepage into any space that may exist between the liner and the flow tube is shown in FIG. 4, where it will be seen that the liner 23 of a magnetic flowmeter in accordance with the invention is dimensioned so that it is slightly longer at either end than the flow tube 24 in which it is inserted. In practice, an alumina liner may be fabricated to protrude about 0.015 inch beyond the flanges 25 coupled to the ends of the flow tube.

The flanges of the magnetic flowmeter are coupled to the flanges of inlet and outlet pipes. As shown in FIG. 4, flange 25 is coupled to flange 26 of inlet pipe 27. Interposed between the intercoupled flanges and pressed therebetween is a gasket 28 of resilient material. Inasmuch as high contact pressure is produced in the small area of contact between the protrusion of the ceramic liner 23 and the gasket, this effects a leak-proof seal preventing seepage into any space that may exist between the liner and the surrounding flow tube.

While there has been shown and described a preferred embodiment of a lined flow tube for an electromagnetic flowmeter in accordance with the invention, it will be understood that many changes and modifications may be made therein without, however, departing from the essential spirit thereof. Thus, instead of alumina, one may use alternative forms of ceramic material such as glass ceramic combinations, zirconia, aluminum silicate or zirconium silicate. Also, instead of welding titanium flanges to the ends of the flow tube, stainless steel flanges may be used.

I claim:

1. A magnetic flowmeter adpated to operate with high-temperature fluids and with highly corrosive fluids or with fluids containing abrasive matter, said flowmeter being provided with a pipe section surrounded by electromagnetic coils to establish a field therein whereby fluid passing through said section and subjected to the field has a voltage induced therein, said pipe section comprising:

A. a tube formed of high-strength, non-magnetic metal;

B. a liner disposed within said tube and constituted by a ceramic materail which is strong under compression but relatively weak under tension, said material being selected from the class consisting of alumina, zirconia, aluminum-silicate and zirconium-silicate, said metal tube reinforcing said liner whereby said pipe section is capable of operating under rigorous conditions, C. mounting flanges secured to the ends of said metal tube for attaching said pipe section to complementary flanges on fluid inlet and outlet pipes, said liner protruding slightly at either end beyond said mounting flanges whereby said protrusions are pressable into gaskets interposed between said mounting flanges and said pipe flanges to effect a leak-proof seal, and D. a pair of electrodes passing through holes in said linear and mounted at diametrically opposed positions on said pipe section, each electrode being insulated from said tube and having a head disposed on said liner to make contact with fluid passing therethrough.

2. A magnetic flowmeter as set forth in claim 1, wherein the metal of said tube is selected from a class consisting of titanium, stainless steel and inconel.

3. A pipe section as set forth in claim 1, wherein said tube is shrink-fitted onto said liner to provide a fluid-tight assembly.

4. A pipe section as set forth in claim 1, wherein the electrodes are hermetically sealed to the holes in the liner to afford a bacteria-proof seal permitting sanitary or biological fluid flow measurement.

* * * * *